(12) United States Patent
Pihlaja et al.

(10) Patent No.: US 7,466,994 B2
(45) Date of Patent: Dec. 16, 2008

(54) SUB-DISPLAY OF A MOBILE DEVICE

(75) Inventors: Pekka Pihlaja, Helsinki (FI); Pentti Ahlgren, Helsinki (FI); Jani Mäenpää, Helsinki (FI)

(73) Assignee: Nokia Corporation, Espoo (FI)

( * ) Notice: Subject to any disclaimer, the term of this patent is extended or adjusted under 35 U.S.C. 154(b) by 483 days.

(21) Appl. No.: 11/027,714

(22) Filed: Dec. 31, 2004

(65) Prior Publication Data

US 2006/0146011 A1 Jul. 6, 2006

(51) Int. Cl.
*H04M 1/00* (2006.01)
(52) U.S. Cl. .................... 455/566; 455/567; 455/575.3; 455/575.4
(58) Field of Classification Search ................ 455/566, 455/567, 575.3, 575.4; 353/79, 119; 379/79, 379/119
See application file for complete search history.

(56) References Cited

U.S. PATENT DOCUMENTS

| | | | | |
|---|---|---|---|---|
| 5,014,046 A | * | 5/1991 | Minami | 345/657 |
| 5,483,250 A | * | 1/1996 | Herrick | 345/32 |
| 5,642,102 A | * | 6/1997 | Panther et al. | 340/7.55 |
| 6,125,286 A | * | 9/2000 | Jahagirdar et al. | 455/566 |
| 6,525,750 B1 | * | 2/2003 | Knox | 345/30 |
| 6,892,082 B2 | * | 5/2005 | Boesen | 455/575.3 |
| 6,952,598 B2 | * | 10/2005 | Kiyomatsu et al. | 455/566 |
| 7,035,665 B2 | * | 4/2006 | Kido et al. | 455/566 |
| 7,054,669 B2 | * | 5/2006 | Ito | 455/566 |
| 7,069,056 B2 | * | 6/2006 | Iwata et al. | 455/566 |
| 7,069,057 B2 | * | 6/2006 | Ishibashi et al. | 455/566 |
| 7,110,796 B2 | * | 9/2006 | Lee | 455/566 |
| 2002/0018307 A1 | | 2/2002 | Nagaoka | |
| 2003/0020850 A1 | | 1/2003 | Funamoto et al. | |

FOREIGN PATENT DOCUMENTS

WO WO 2004/003643 1/2004
WO WO 2004/008191 1/2004

* cited by examiner

*Primary Examiner*—Duc M Nguyen
(74) *Attorney, Agent, or Firm*—Alfred A. Fressola; Ware, Fressola, Van Der Sluys & Adolphson LLP

(57) ABSTRACT

The invention relates to a mobile device, which comprises a first housing and a second housing, which housings are arranged movable in relation to each other to at least a first and a second position; the first housing comprising a primary display for displaying information and arranged to be visible for a user at least in the first position; the device further comprising a passive image steering element that is adapted to steer at least a part of the view of said primary display to become visible for the user as a secondary display in the second position. This invention also relates to a image steering module, a method in a mobile device and a computer program for controlling a user interface of a device.

19 Claims, 5 Drawing Sheets

SUB-DISPLAY OF A MOBILE DEVICE

FIELD OF THE INVENTION

This invention relates to a mobile device, an image steering module, a display method in a mobile device and a computer program for controlling a user interface of a mobile device.

BACKGROUND OF THE INVENTION

Foldable phones are often equipped with two displays: a large-sized first display for use mainly in an open-folded position and a smaller second display for use mainly in a closed-folded position. The second display (called a sub-display herein after) is typically used for displaying time/date, who is calling, message received or other similar status info.

Traditionally large-sized displays (called a main display herein-after) for displaying a menu, an image or a picture have been provided to mobile phones, and nowadays further sub-displays for displaying sub-information or secondary information are becoming even more popular. In such a mobile phone that has the above-mentioned configuration, it is possible to significantly improve the usability of a thus configured mobile phone by selectively displaying information on the main display and the sub-display.

Among those mobile phones having such a sub-display, there is a folding type (sometimes called a clamshell-type) mobile phone, wherein the mobile phone has a main display provided inside of an upper housing, and a sub-display provided on the top surface of a lower or a upper housing, and a hinge that enables the upper housing and the lower housing to open/close so as to cover the respective top surfaces of each other.

In the mobile phone configured as above, the sub-display is configured to be exposed to the outside even in a closed position of the housings. When the housings are opened in order, for example, to make a call, at least the main display is exposed to the user. When the housings are closed for carrying the device, the main display is usually covered but the sub-display is exposed to the user, and accordingly, it is able to provide the user some information irrespective of the opening/closing of the housings.

Other types of mobile devices comprising main displays and sub-displays are also known. Such devices may comprise, instead or in addition to a traditional hinge, a slide or a swivel.

Supplying the device with a second display makes the mobile device thicker and also causes additional expenses. The overall complexity of the device increases significantly and this raises several mechanical and electrical issues.

SUMMARY OF THE INVENTION

Now, a solution has been invented, which enables the implementation of a mechanically simple second display for mobile devices.

To attain this purpose, the mobile device comprises at least a first housing and a second housing, which housings are arranged movable in relation to each other to at least a first and a second position; the first housing comprises a primary display for displaying information and arranged to be visible for a user at least in said first position; and the device further comprises at least one passive image steering element adapted to steer at least a part of the view of said primary display to become visible for the user as a secondary display in said second position.

The invention further relates to a passive image steering module for a mobile device, which device comprises at least a first housing and a second housing, which housings are arranged movable in relation to each other at least to a first and a second position; the first housing comprises a primary display for displaying information and arranged to be visible for a user at least in said first position; and the device further comprises a passive image steering module, which module is adapted to steer at least a part of the view of said primary display to become visible for the user as a secondary display in said second position.

In addition, the invention relates to a method in a mobile device, which device comprises at least a first housing and a second housing, which housings are arranged movable in relation to each other to at least a first and a second position, and the first housing comprises a primary display for displaying information and arranged to be visible for a user at least in said first position; wherein at least a part of the view of said primary display is steered to be visible for the user as a secondary display via a passive image steering element when the device is in the second position.

The invention further relates to a computer program product, which comprises commands stored on a readable medium, which commands when executed by a processor are for controlling a user interface of a device, which device comprises at least a first housing and a second housing, which housings are arranged movable in relation to each other to at least a first and a second position; the first housing comprises a primary display for displaying information, which is a part of the user interface, and arranged to be visible for a user at least in said first position; and the device further comprises a passive image steering element adapted to steer at least a part of the view of said primary display visible for the user as a secondary display in said second position; in which case the program comprises at least commands for detecting the relative positions of said first and second housings; for forming position data based on said relative position; and for controlling the user interface of the device on the basis of the position data.

In one embodiment the passive image steering element is a reflector element, such as, for example, a mirror or a prism, which is adapted to reflect at least a part of the view of the display when the device is in a closed position. In another embodiment the passive image steering element is a refractor element, as for example a lens or a lens system. The image steering element may also be an organised (arranged) fiberoptic system or a corresponding waveguiding system capable of transferring images. Further, the image steering element may be a combination of reflecting, refracting or waveguiding optical components.

In one embodiment according to the present invention, a first housing and a second housing are provided to configure a folding type of a mobile device, and these two housings are linked to each other to be freely opened or closed, and a first information display is provided in the first housing and a second information display in the second housing, or a section for linking. In this case, the first information display is covered by closing the first and second housings, while the second information display is exposed to the outside in a closed position.

In one embodiment, when the device is in a closed position, the display direction of the first information display is changed into a mirror image, for example, to secure a better usability of the second information display.

In one embodiment a mirror is located on the hinge area of a foldable phone. Thus, for example, when the phone is in a pocket in a closed position, the user can see basic information through the mirror.

In one embodiment the mirror is located at the end of the lower phone part between hinge elements at a substantially 45° angle from the main display. Thus, when the phone is in a closed position, the user can see some lines of the main display. On these lines, it is possible to show desired information, such as time, date or other information.

In one embodiment the passive image steering element is adapted to steer at least a part of the view of the display in a direction that is in a −30 to +30 degree angle in relation to the surface of the display.

The different embodiments of the invention offer several advantages over solutions of prior art. Depending on the implementation manner of the embodiment, the invention may provide, for example, one or more of the following advantages:

a second display without any active second display component
only one active display component
a slimmer solution
a solution with lower costs
reduced electrical interference
increased reliability
reduced power consumption in compact mode

DESCRIPTION OF THE DRAWINGS

In the following, the invention will be described in more detail with reference to the appended principle drawings, in which.

For the sake of clarity, the figures only show the details necessary for understanding the invention. The structures and details which are not necessary for understanding the invention and which are obvious to anyone skilled in the art have been omitted from the figures in order to emphasize the essential characteristics of the invention.

DETAILED DESCRIPTION OF THE INVENTION

Figure 1:
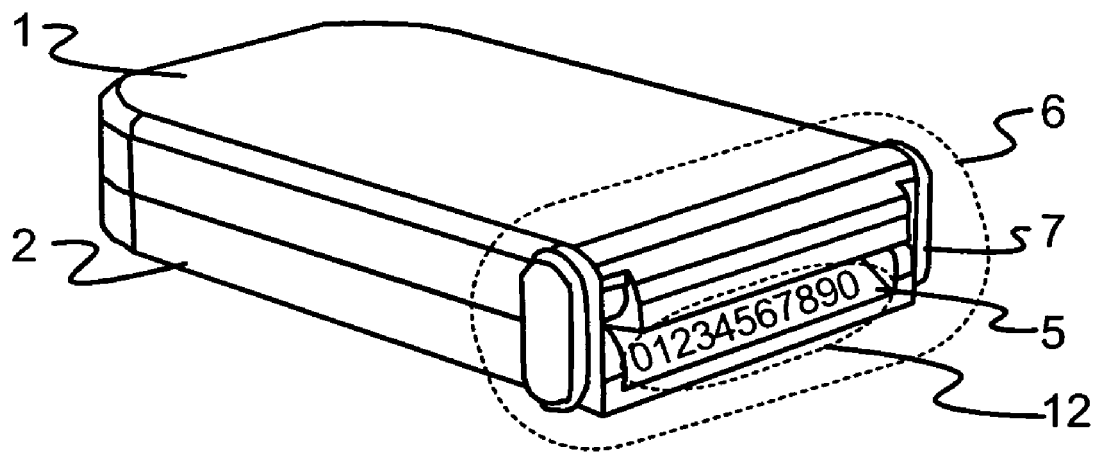
FIG. 1 shows an embodiment of a device according to the invention in a closed position
Figure 2:
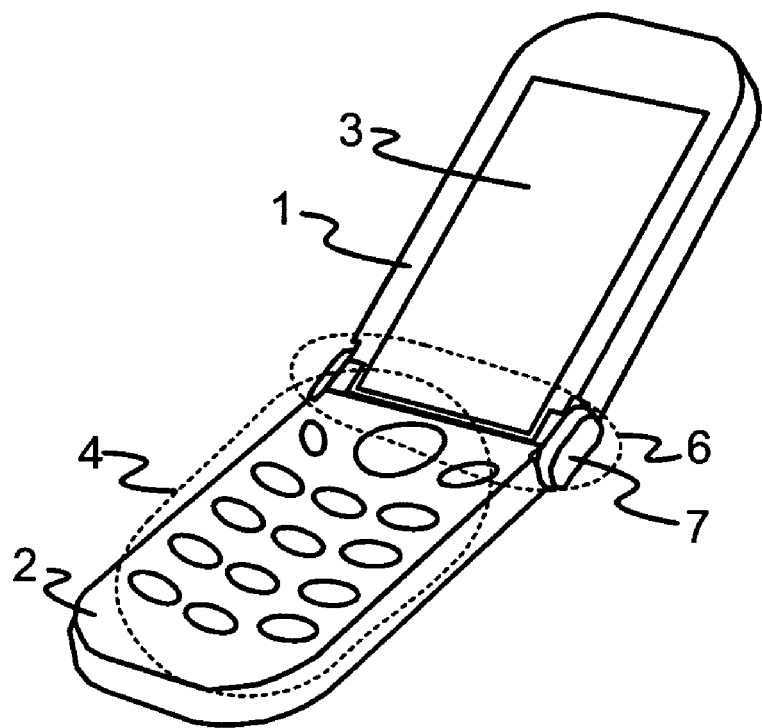
FIG. 2 shows a device according to the invention in an open position

FIGS. 1 and 2 show an embodiment of a mobile device, i.e. a mobile device according to the invention. The device, as a mobile phone, comprises a first housing 1 and a second housing 2. These housings or bodies 1, 2 are linked to each other to be freely opened (full-operation mode) or closed (compact mode). FIG. 1 shows the device in a closed position and FIG. 2 shows the device in an open position. In this example the first housing 1 comprises a display 3 (main display) for displaying information. The second housing 2 comprises a keyboard 4 and buttons for inputting information.

The structures connected to the operation of the device, such as, for example, power sources, controllers, transmitters, receivers, memories, connectors, can be placed application-specifically into one or more housings 1, 2.

Figure 3:
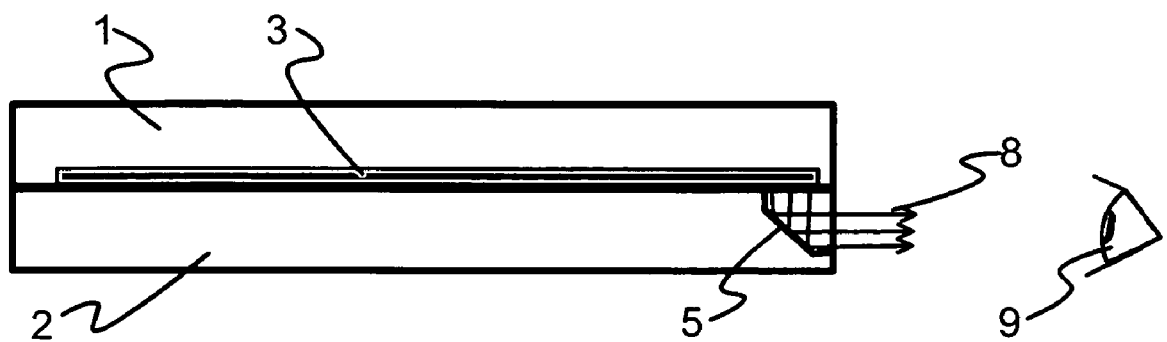
FIG. 3 shows in a side view the embodiment according to FIG. 1

In this embodiment a image steering element 5 is a mirror 5 (sub-display) that is located on the hinge area 6 of a foldable phone. The mirror 5 is located at the end of the second housing 2 between the hinge elements 7 at a substantially 45 degree angle from the main display 3 as can seen in FIG. 3. In the figure are also schematically shown light beams 8 and a reflection route from the main display 3 to the user's eye 9 via the image steering element 5.

Figure 4:
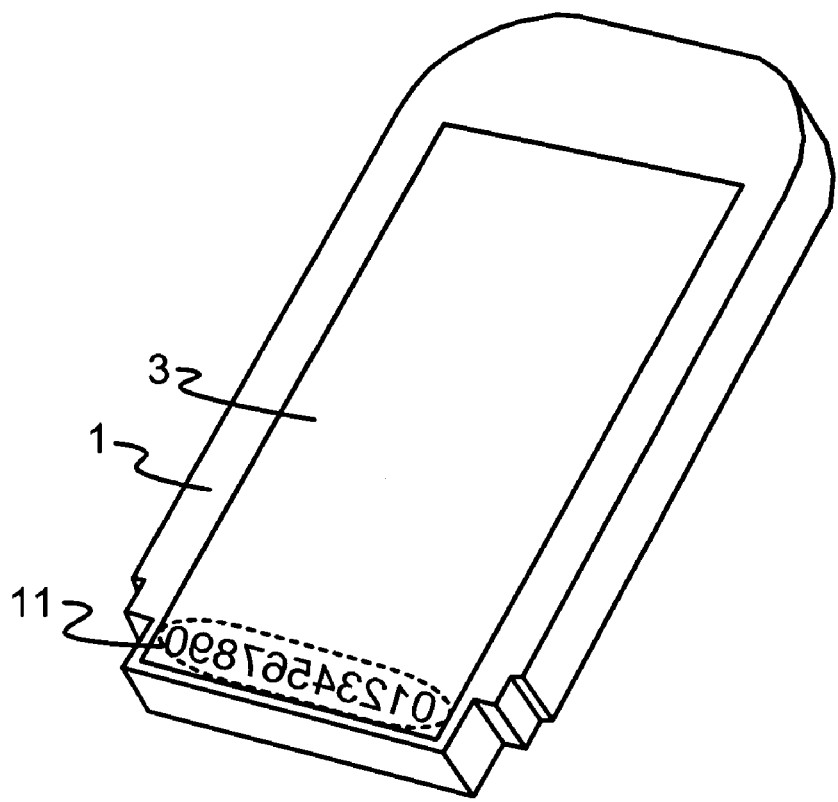
FIG. 4 shows a view of a main display according to FIG. 1

Thus, when the phone is in a closed position, the user can see basic information through the mirror 5. FIG. 4 shows the area 10 of the main display 3 that is shown via the mirror 5, when the phone is in the compact mode. In this example the user can see the lowest lines (lowest area) of the main display 3. The basic information could be, for example, time/date or other information.

Figure 5:
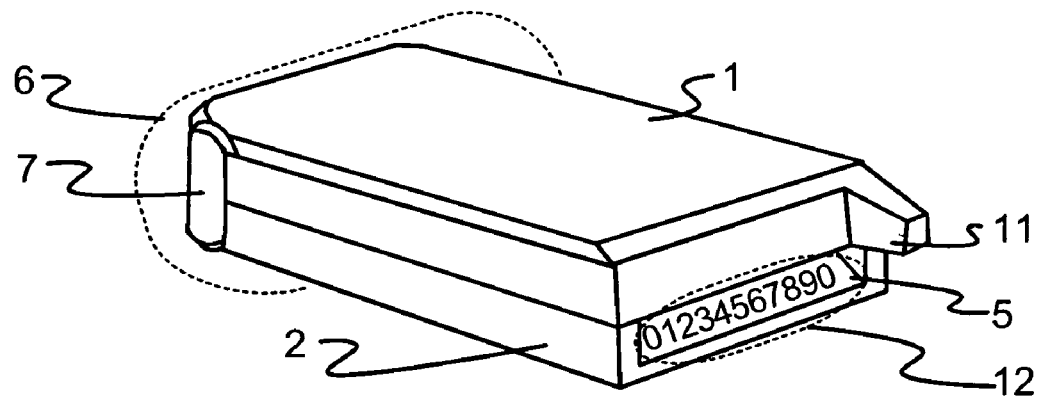
FIG. 5 shows another embodiment of the invention in a closed position
Figures 6, 7:
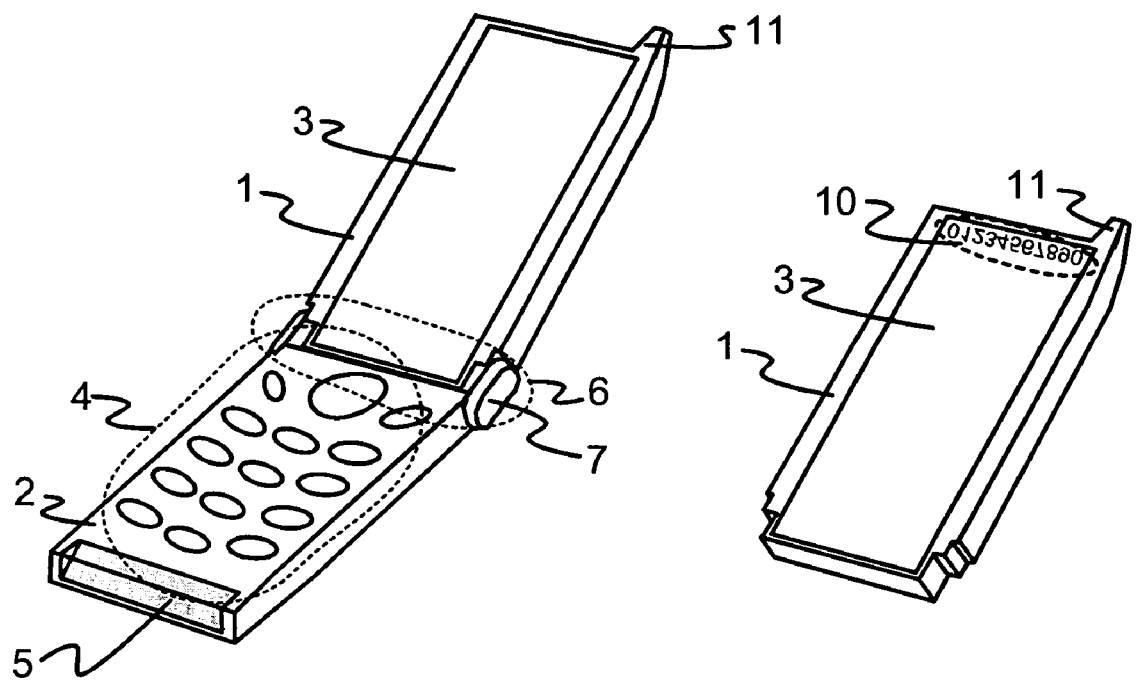
FIG. 6 shows the device according to FIG. 5 in an open position
FIG. 7 shows a view of a main display according to FIG. 5

FIGS. 5 and 6 show another embodiment of a mobile device according to the invention. In this case, in the mobile phone of this configuration, an antenna 10 is projected from the first housing 1, so that when the housings 1, 2 are closed in a compact mode, it is very common for a user to hold the mobile phone in such a manner that the antenna 10 is positioned on the upper side as shown in FIG. 5 when the housings 1, 2 are closed.

In this embodiment the mirror 5 (the image steering element, sub-display) is located on the same side of the phone as the antenna 10 when the phone is in a compact mode. In this case the mirror 5 is on the opposite side of the second housing 2 from the hinge area 6 of the foldable phone. The mirror 5 is located at the end of the second housing 2 at a substantially 45 degree angle from the main display 3. FIG. 7 shows the area 11 of the main display 3 that is shown via the mirror 5, when the phone is in a compact mode.

It is possible to locate the image steering element 5 in many places in the device. Foregoing examples show only two examples of some possible placements. It is also possible to arrange the image steering element 5, for example, on the other sides of the device. Also the angle of the mirror 5 can vary from the examples. In preferred embodiments the angle is 30-60°. In one embodiment the angle is adjustable by the user. Then when the phone is in compact mode the user can see basic information through the mirror 5 from the position which is suitable for his purpose.

Figure 8:
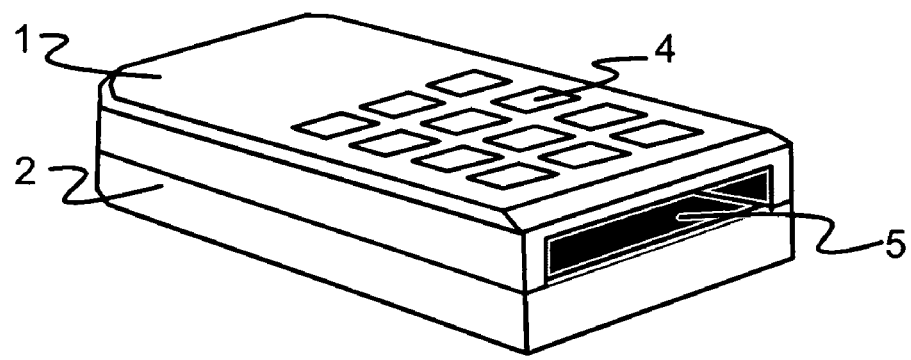
FIG. 8 shows a third embodiment of the invention in a closed position
Figure 9:
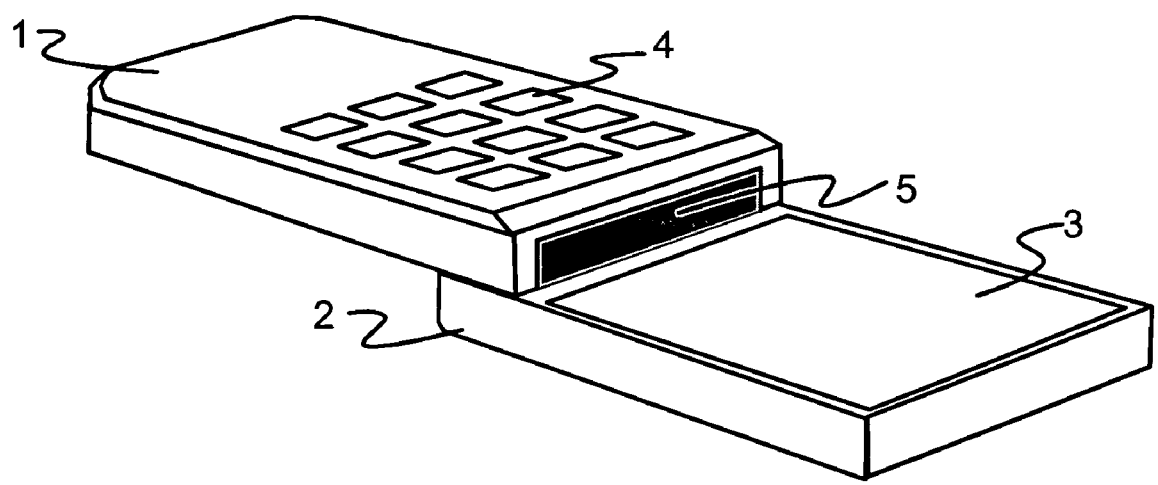
FIG. 9 shows the device according to FIG. 8 in an open position

The above-presented examples show foldable devices. FIGS. 8 and 9 show some other constructions. FIG. 8 shows another embodiment of a mobile device with the image steering element 5 according to the invention in a compact mode. FIG. 9 shows the device in a full-operation mode. In this example there is a sliding mechanism in the device. In this example the housings 1, 2 are arranged to be moved in relation to each other to an open or closed position by sliding the housings in an essentially linear manner.

The sub-display 5 can be arranged in many ways and on different sides of the device. In the example according to FIGS. 8 and 9 the sub-display 5 is at the end of the device, which end is the upper side of the second housing 2 when the device is in a typical full-operation mode. This sub-display can be, for example, a refractive optical element or an optical waveguide.

In the above-presented embodiments the sub-display 5 shows a part of the view of the main display 3. This part is called a sub-view 12 hereinafter. The size of the sub-view 12 depends on the size of the image steering element 5. In many cases it is enough to show a couple of lines of the main display 3. In one embodiment the view of the main display 3 is essentially similar in the full-operation mode and in the compact mode. This is user friendly if the sub-view 12 contains only symbols and icons. If there is text, it is not very user-friendly because the sub-view is a mirror image of the part of the main view 11.

Figure 10:
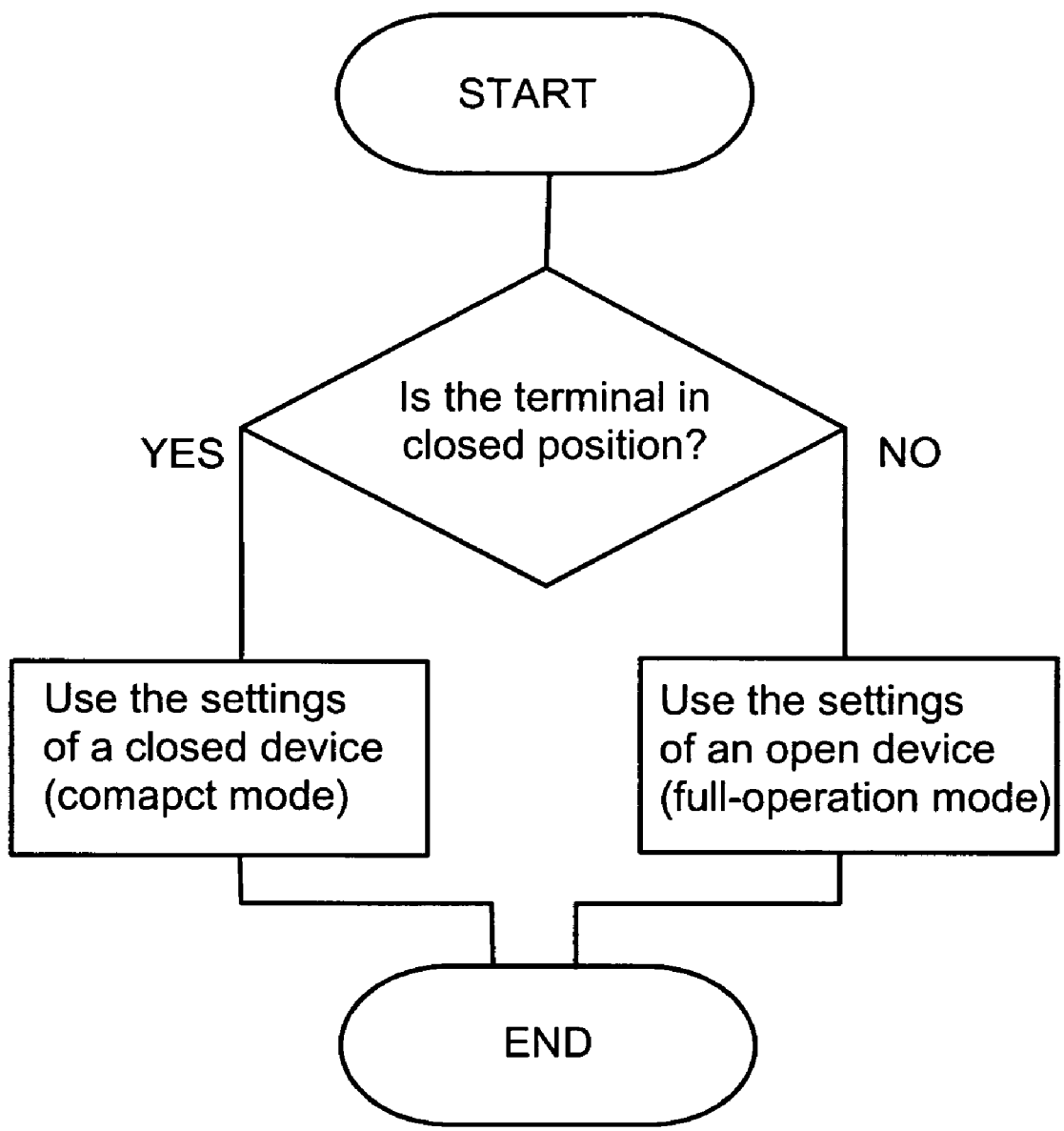
FIG. 10 shows the control principle of the device according to an embodiment as a flow chart.

In another embodiment the view of the main display 3 is modified in the compact mode. The operation is described in FIG. 10, which shows a flow chart of one embodiment. First the system identifies the mode of the device. If the housings are closed, then the system takes the control parameters of the compact mode. In this compact mode the main display is controlled so that the legibility of the second display is maximized and/or the power consumption of the main display is minimized.

In the compact mode, for example, the resolution, brightness, colour, font or icon type, size, orientation or other parameters of the main display can be changed to improve the visibility and readability of the sub-display.

The image steering element 5 according to the device may have unity optical magnification, wherein the sub-view 12 of the main display 3 is reproduced to the user substantially in its original size. However, the image steering element 5 may also comprise one or more optical elements with non-unity optical magnification, for example lenses, that affect the optical magnification of the image steering system either in one or more directions. Therefore, the main display view may be reproduced in a smaller or larger size on the second display, and the aspect ratio of the display may be altered.

For example, if the image steering element 5 is made optically magnifying, only a smaller part of the main display 3 needs to be active in closed position. If the resolution of the main display is high enough, this can save electrical energy and the input aperture of the image steering element 5 can be made smaller and less disturbing. According to this embodiment even if the sub-view 12 is arranged, for example, in the corner of the main display 3, the second display can be made wide enough to cover the entire width of the device housing.

In order to enhance the visibility, the brightness of the sub-view of the main display 3 can be increased to compensate for possible light attenuation or magnification change due to the optical components of the image steering element 5.

In one embodiment the control parameters of the compact mode are made individual for different profiles. For example, in the "Outdoor"-profile there could be different parameters than in the "Meeting"-profile. There could be some differences in the information that is shown in the sub-display, for example, when the Meeting-profile is activated, only certain type of information is shown on the second display. Such information could contain information about received messages but exclude information about received calls.

In one embodiment the user can select the observation direction of the device in the compact mode. In one preferred embodiment this direction parameter depends on the profile. For example, in the "Outdoor"-profile it could be defined that the information is shown in the first direction and in the "Meeting"-profile in the second direction. The second direction could be, for example, upside-down compared to the first direction. This is beneficial if the user carries the device attached to his belt in a similar manner as a pager or beeper, but has a habit of keeping the device on the table in some other orientation.

In another embodiment there is only the relevant part of the main display 3 in the active mode when the device is in the compact mode. Preferably this active area is essentially the same as the view of the sub-view 12. This embodiment saves energy and the main display component 3. The main display can be arranged as a combination of several separate display areas that can be activated or deactivated separately.

In the previous examples the mirror 5 is used as the image or beam steering element. It is also possible to use other components to guide a part of the view of the display 3 to the surface of the device. In one embodiment a prism is used and in another embodiment a lens arrangement is used. Of course it is possible to combine different components.

One possible image steering element is an organised fiberoptic bundle or fiberoptic faceplate. Such an element is capable of transferring an image from one end to another through individual optical fibers that are arranged/organized in respect to each other in a specific order. Depending on the number of the fibers the resolution of such a fiberoptic device can even exceed the pixel resolution of the main display. The input end of a fiberoptic faceplate or bundle is preferably arranged to be in contact with the main display in order to avoid the use of any additional optical components, such as relay lenses. The fiberoptic device can be manufactured to have a suitable angle between its input and output ends.

In the above-presented examples the device comprises two housings 1, 2. The invention is not to be restricted by these examples. It is possible to use this invention in devices that comprise a different number of housings 1, 2. The housings of the device may be connected to each other in variety of ways, for example, by hinges, sliding mechanisms, rotating or swivelling mechanisms, etc. Depending on the relative arrangement of the housing or blocks of the device, the main display and the image steering element may be arranged in different ways to produce a sub-display or a secondary display according to the invention. A single device can also comprise more than one such secondary displays formed using one or more image steering elements.

The mobile device could be a mobile phone, a communication device, an electronic notebook and/or a palm computer etc.

By combining, in various ways, the modes and structures disclosed in connection with the different embodiments of the invention presented above, it is possible to produce various embodiments of the invention in accordance with the spirit of the invention. Therefore, the above-presented examples must not be interpreted as restrictive to the invention, but the embodiments of the invention may be freely varied within the scope of the inventive features presented in the claims hereinbelow.

What is claimed is:

1. A mobile device comprising:
a first housing and a second housing, which housings are movably arranged in relation to each other to at least a first and a second position, wherein the first position is an open position and the second position is a closed position;
the first housing comprising a primary display for displaying information and arranged to be visible for a user at least in said first position;
the device further comprising at least one passive image steering element at the end of the device, the image steering element is configured to steer at least a part of a view of said primary display to become visible for the user as a secondary display when the first and second housings are in said second position and the image steering element is configured to steer the view to a direction that is different than the direction of view of the primary display so as to be visible at said secondary display.

2. The mobile device according to claim 1, wherein the first housing comprises the primary display and the second housing comprises the secondary display.

3. The mobile device according to claim 1, wherein the at least first and second housings are arranged to be foldable in relation to each other.

4. The mobile device according to claim 1, wherein the at least first and second housings are arranged to be slidable in relation to each other.

5. The mobile device according to claim 1, wherein the at least first and second housings are arranged to swivel in relation to each other.

6. The mobile device according to claim 1, wherein the passive image steering element comprises one or more reflecting optical components.

7. The mobile device according to claim 1, wherein the device comprises two hinge elements to form a foldable joint for connecting the first and second housings, and the passive image steering element is arranged between the hinge elements.

8. The mobile device according to claim 1, wherein the passive image steering element is adapted to steer at least a part of the view of the display in the direction that is in a −30 to +30 degree angle in relation to the surface of the display.

9. A passive image steering module for a mobile device, comprising:
   a first housing and a second housing, which housings are movably arranged in relation to each other at least to a first and a second position, wherein the first position is an open position and the second position is a closed position;
   the first housing comprising a primary display for displaying information and arranged to be visible for a user at least in said first position;
   the device further comprising a passive image steering module at the end of the device,
   which module is configured to steer at least a part of a view of said primary display to become visible for the user as a secondary display when the first and second housings are in said second position and the image steering element is configured to steer the view to a direction that is different than the direction of view of the primary display so as to be visible at said secondary display.

10. The module according to claim 9, wherein the module comprises one or more reflecting optical components.

11. The module according to claim 9, wherein the module is adapted to steer at least a part of the view of the display in the direction that is in a −30 to +30 degree angle in relation to the surface of the display.

12. A method comprising:
    displaying information on a primary display so as to be visible in a direction of view for a user at least when a first housing of a mobile device is in a first position relative to a second housing of said mobile device, the first position being an open position, and
    passively steering at least a part of a view of said primary display so as to become visible for the user as a secondary display at an end of the device at a direction of view different from the direction of view of the primary display when the first housing is in at least a second position relative to said second housing, the second position being a closed position.

13. The method according to claim 12, wherein a mirror image is displayed on the primary display when the device is in a closed position.

14. The method according to claim 12, wherein only a part of the primary display is activated when the device is in a closed position.

15. The method according to claim 12, wherein at least one of the following characteristics of the primary display is changed to affect the secondary display:
    resolution, brightness, colour, font, icon type, size or orientation.

16. A computer readable medium, stored with commands executable by a processor
    for detecting relative positions of a first housing and a second housing of a device, which housings are movably arranged in relation to each other to at least a first and a second position, wherein the first position is an open position and the second position is a closed position the first housing comprising a primary display for displaying information, which is a part of a user interface of the device, and arranged to be visible for a user at least in said first position, the device further comprising a passive image steering element adapted to steer at least a part of a view of said primary display visible for the user as a secondary display when the first and second housings are in said second position, the image steering device steering the view to a direction that is different than the direction of view of the primary display,
    for forming position data based on said relative position;
    for controlling the user interface of the device on the basis of the position data.

17. The computer readable medium according to claim 16, storing commands for displaying a mirror image on the primary display when the device is in a closed position.

18. The computer readable medium according to claim 16, storing commands for activating only a part of the primary display when the device is in a closed position.

19. The computer readable medium according to claim 16, storing commands for changing at least one of the following characteristics of the primary display: resolution, brightness, colour, font, icon type, size or orientation.

* * * * *